US010789561B2

(12) United States Patent
Zeng et al.

(10) Patent No.: US 10,789,561 B2
(45) Date of Patent: Sep. 29, 2020

(54) RECOMMENDING PRODUCTION PLANS (75) Inventors: Jun Zeng, Sunnyvale, CA (US); Hamid Reza Motahari Nezhad, Los Altos, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1338 days.

(21) Appl. No.: 14/354,714

(22) PCT Filed: Nov. 21, 2011

(86) PCT No.: PCT/US2011/061672
§ 371 (c)(1),
(2), (4) Date: Apr. 28, 2014

(87) PCT Pub. No.: WO2013/105911
PCT Pub. Date: Jul. 18, 2013

(65) Prior Publication Data
US 2014/0297357 A1 Oct. 2, 2014

(51) Int. Cl.
G06Q 10/06 (2012.01)
G06Q 50/16 (2012.01)
G06Q 50/08 (2012.01)

(52) U.S. Cl.
CPC ....... G06Q 10/06316 (2013.01); G06Q 10/06 (2013.01); G06Q 50/08 (2013.01); G06Q 50/16 (2013.01)

(58) Field of Classification Search
CPC .. G06Q 10/06316; G06Q 50/04; G06Q 50/06; G06Q 50/16
USPC ....................................................... 705/7.26
See application file for complete search history.

(56) References Cited

U.S. PATENT DOCUMENTS

| 6,578,005 B1 * | 6/2003 | Lesaint .................. G06Q 10/06 705/7.14 |
| 7,349,121 B2 | 3/2008 | Dechamps |
| 2007/0070379 A1 | 3/2007 | Rai et al. |

(Continued)

FOREIGN PATENT DOCUMENTS

| JP | 2001056811 | 2/2001 |
| JP | 2005085207 | 3/2005 |

(Continued)

OTHER PUBLICATIONS

Motahari-Nezhad et al. ("IT Support Conversation Manager: A Conversation-Centered Approach and Tool for Managing Best Practice IT Processes," 2010 14th IEEE International Enterprise Distributed Object Computing Conference, Vitoria, 2010, pp. 247-256).*

(Continued)

Primary Examiner — Eric W Stamber
Assistant Examiner — George H Walker, III
(74) Attorney, Agent, or Firm — Fabian VanCott (57) ABSTRACT In one embodiment, a method of recommending a production plan includes calculating a similarity score between an incoming order and each historical order in a historical order database, providing a list of most similar historical orders and corresponding historical production plans ranked according to highest similarity scores, receiving an election indicating a historical production plan as a selected production plan, and admitting the selected historical production plan to fulfill the incoming order.

20 Claims, 8 Drawing Sheets

(56) References Cited

U.S. PATENT DOCUMENTS

| | | | |
|---|---|---|---|
| 2008/0027776 A1* | 1/2008 | Sourov | G06Q 10/06 705/7.23 |
| 2008/0077575 A1* | 3/2008 | Tateno | G06F 17/30386 |
| 2009/0199734 A1 | 8/2009 | Vered | |
| 2010/0195140 A1* | 8/2010 | Shepherd | G06F 3/1204 358/1.15 |
| 2010/0268661 A1* | 10/2010 | Levy | G06Q 30/02 705/347 |
| 2011/0069166 A1 | 3/2011 | Rauscher et al. | |

FOREIGN PATENT DOCUMENTS

| | | |
|---|---|---|
| JP | 2009176166 | 8/2009 |
| JP | 2011215927 | 10/2011 |
| KR | 20030039791 | 5/2003 |

OTHER PUBLICATIONS

Cosine Similarity and Term Weight Tutorial, Last Updated Oct. 26, 2006, downloaded on May 29, 2017 from https://web.archive.org/web/20120501183514/http://www.miislita.com/information-retrieval-tutorial/cosine-similarity-tutorial.html.*

Duen-Ren Liu, Chih-Kun Ke, Knowledge support for problem-solving in a production process: A hybrid of knowledge discovery and case-based reasoning, Expert Systems with Applications, vol. 33, Issue 1, Jul. 2007, pp. 147-161, ISSN 0957-4174, https://doi.org/10.1016/j.eswa.2006.04.026. (http://www.sciencedirect.com/science/article/pii/S09574174060.*

Minor, M., Bergmann, R., Gorg, S., Walter, K.: Reasoning on business processes to support change reuse. In: 13th IEEE Conference on Commerce and Enterprise Computing, pp. 18-25. IEEE Computer Society, Luxemburg (2011) downloaded Jan. 3, 2018 from www.wi2.uni-trier.de/shared/publications/2011_CEC11_Minor_etal.pdf.*

M. Minor, R. Bergmann, S. Görg, Case-based adaptation of workflows, Information Systems, Available online Dec. 22, 2012, ISSN 0306-4379, http://dx.doi.org/10.1016/j.is.2012.11.011>. downloaded Jan. 3, 2018 from https://pdfs.semanticscholar.org/1e39/764a20f5e64d0bce47d8cdec6a311251b82d.pdf.*

Li et al.; An Expert Simulation System for the Master Production Schedule; Computers in Industry; vol. 19; Issue 1; Apr. 1992; ; pp. 127-133.

* cited by examiner

Example Print Production Plan

Fig. 4

Example of a Most Similar Historical Order List

Fig. 5

Production Planning Composer driven by step recommender module 338

Fig. 6

Production Planning Composer driven by step recommender module 338

Fig. 7a

Production Planning Composer driven by step recommender module 338

Fig. 7b

Production Planning Composer driven by step recommender module 338

RECOMMENDING PRODUCTION PLANS

BACKGROUND

Production environments exist in which the fulfillment of new customer orders can involve the use of both pre-existing and newly developed production plans or templates. One example of such a production environment is in the building of flexible modular homes where customers are able to modify existing floor plans to suit their personal tastes. Another example is in the commercial print industry where a diversity of print products is available through diverse manufacturing processes. The variety of print products and the numerous processes used to produce such products make the task of production planning by print service providers very challenging. In the commercial print industry, production planning is therefore often done by veteran managers having significant experience and extensive knowledge of the print products, as well as the machines, tools and out-sourcing options available to produce these products.

BRIEF DESCRIPTION OF THE DRAWINGS

The present embodiments will now be described, by way of example, with reference to the accompanying drawings, in which.

DETAILED DESCRIPTION

Overview

As generally noted above, the fulfillment of new customer orders in certain production environments can involve the use of both pre-existing and newly developed production plans or templates. In the commercial print industry, for example, print service providers typically manufacture many print products on a repeating basis which enables the use of previously developed production plans. However, such print service providers usually also manufacture different print products that involve the use of new or modified production plans. In general, the wide variety of print products and manufacturing processes encountered in the commercial printing industry makes the production planning a challenging task.

Print service providers (PSP's) have used a number of methods in the past to generate production plans for fulfilling customer orders. In a human-based method of production planning, for example, PSP's have relied on veteran managers having significant experience and tribal knowledge in the PSP's print products, equipment and out-sourcing options to generate production plans. One issue with this human-based method is that employment trends indicate employees are less and less likely to remain with the same company for long periods of time. This decreases the likelihood that an employee will develop the type of experience and tribal knowledge integral to performing the task of production planning. Another issue is that print order types are becoming more and more diverse, while at the same time calling for lower and lower quantities of the print product. This trend makes the method of human-based production planning less and less affordable in terms of the cost and efficiency.

In addition to the human-based method of production planning, some PSP's have used software-based production planning solutions. These solutions rely on a pre-populated, static library of production planning templates that apply to all the product types the PSP can foresee to produce. The production planning templates usually have a unique product-type identifier that enables the planning software to review new orders for a product-type identifier attribute, and then to retrieve templates having the appropriate identifier. One issue with these prior software-based production planning solutions is that the print production factory is limited to taking only familiar incoming orders that call for pre-determined product types. In addition, increasing the types of products that can be used in incoming orders involves manual effort to maintain and update the production planning template library.

Embodiments of the present disclosure improve on prior methods of production planning, in general, through a self-learning, dynamic solution that provides production planning automation for any type of incoming order. A software-based production planning recommender finds, recommends and guides toward the best matching production plan for any incoming order using machine learning algorithms. The production planning recommender provides an automated solution that dynamically learns and expands its capability in response to increasingly diverse product types. The production planning recommender includes a similarity algorithm to compare an incoming order with a historical order database and to calculate a similarity score for the incoming order with respect to each historical order in the historical order database (i.e., each order that has been fulfilled successfully in the past). A list of the most similar historical orders is generated using historical orders that have the highest similarity scores. The list of most similar historical orders along with their corresponding historical production plans is reported to the production manager, who can elect to fulfill the incoming order using the highest scored production plan, or another production plan on the list. When the production manager approves the production plan of an historical order, the production plan is admitted as the production plan to be released to the factory floor for fulfillment of the incoming order. Upon successful fulfillment of the incoming order, the incoming order and the production plan used to fulfill it are saved into the historical record database.

In cases where an incoming order is a new order (e.g., has new print product types, unusual customization requirements, etc.) for which the list of most similar historical orders does not contain an ideal match to fulfill the incoming order, the production planning recommender guides the production manager through a customization process to customize one of the production plans on the list. In cases where the incoming order is a new order for which there is no matching historical order in the historical database, the production planning recommender guides the production manager through a process of generating an entirely new production plan to enable fulfillment of the incoming order.

The process of generating recommended production plans is an automated software service whose level of automation relies on the richness of the historical record (i.e., the historical order database). When the historical record is not abundant, the production planning recommender (i.e., through a production step recommender) requests additional step choices from the production manager. The level of human involvement decreases as historical records in the historical order database increase and the production planning recommender automatically accumulates knowledge and insights about the operations of the print production factory. At a more mature stage, when the production planning recommender software has built up a sufficient knowledge base, the production manager can turn the production planning recommender on "auto-pilot", such that the historical production plan associated with the highest similarity scored historical order is automatically selected as the default production plan to be sent to the factory floor to fulfill the incoming order. In this mode, the production manager intervenes in the process only for outlier orders.

In one example embodiment, a method of recommending a production plan includes calculating a similarity score between an incoming order and each historical order in a historical order database, providing a list of most similar historical orders and corresponding historical production plans ranked according to highest similarity scores, receiving an election indicating a historical production plan as a selected production plan, and admitting the selected historical production plan to fulfill the incoming order.

In another example embodiment, a method of recommending a production plan includes calculating a similarity score between an incoming order and each historical order in a historical order database, determining from the similarity scores that no production plan associated with any historical order exceeds a similarity threshold, requesting a first step for a new production plan, generating a list of candidate next-steps upon receiving a first step, inserting the next step in the new production plan and generating another list of candidate next-steps upon receiving an election for a next step, and admitting the new production plan to fulfill the incoming order upon receiving no additional elections.

In another example embodiment, a processor-readable medium stores code representing instructions that when executed by a processor cause the processor to calculate a similarity score between an incoming order and each historical order in a historical order database, provide a list of most similar historical orders and corresponding historical production plans ranked according to highest similarity scores, receive an election indicating a historical production plan as a selected production plan, and admit the selected historical production plan to fulfill the incoming order.

In another example embodiment, a processor-readable medium stores code representing instructions that when executed by a processor cause the processor to calculate a similarity score between an incoming order and each historical order in a historical order database, determine from the similarity scores, that no production plan associated with any historical order exceeds a similarity threshold, request a first step for a new production plan, generate a list of candidate next-steps upon receiving a first step, insert the next step in the new production plan and generate another list of candidate next-steps upon receiving an election for a next step, and admit the new production plan to fulfill the incoming order upon receiving no additional elections.

Illustrative Embodiments

Figure 1:
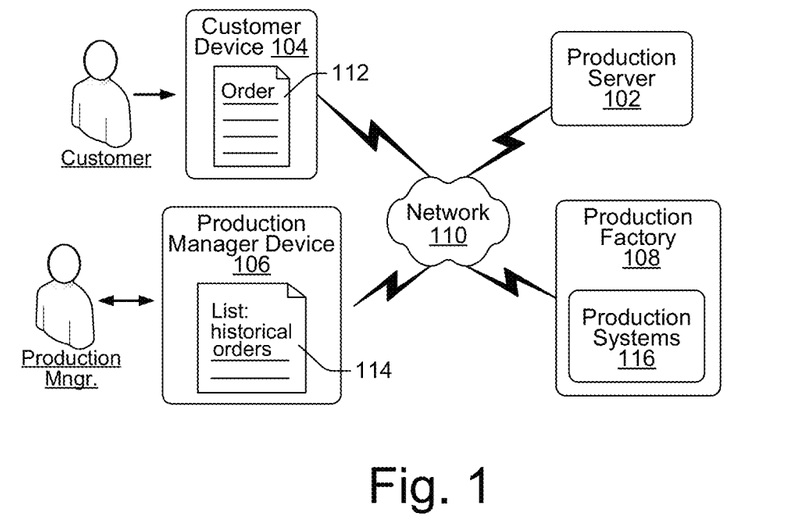
FIG. 1 shows an exemplary production environment 100 suitable for implementing a production plan recommender as disclosed herein, according to an embodiment.

FIG. 1 shows an exemplary production environment 100 suitable for implementing a software-based production plan recommender as disclosed herein, according to an embodiment of the disclosure. Production environment 100 includes a production server 102 coupled to a customer device 104, a production manager device 106, and a production factory 108 through a network 110. Network 110 is intended to represent any of a variety of conventional network topologies and types (including optical, wired and/or wireless networks), employing any of a variety of conventional network protocols (including public and/or proprietary protocols). Network 110 may include, for example, a corporate network, a home network, or the Internet, as well as one or more local area networks (LANs) and/or wide area networks (WANs) and combinations thereof. In one example implementation, an incoming production order 112 is submitted to the production server 102 by a customer from a customer device 104. Production server 102 provides a ranked list 114 of historical orders with recommendations that facilitate the selection of a production plan to fulfill the incoming order 112. The list 114 also may include previously customized plans or newly generated plans. Based on the recommendations, a production manager at production manager device 106 elects a production plan, and the production server 102 admits the production plan to the production factory 108 for fulfillment via various production systems 116.

Figure 2:
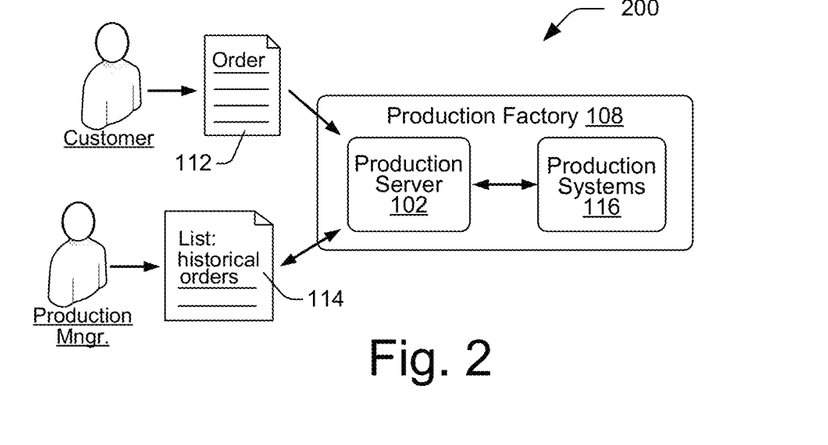
FIG. 2 shows an alternate exemplary production environment suitable for implementing a production plan recommender, according to an embodiment.

FIG. 2 shows an alternate exemplary production environment 200 suitable for implementing a production plan recommender as disclosed herein, according to an embodiment of the disclosure. The production environment 200 of FIG. 2 functions in a manner similar to the production environment 100 of FIG. 1, except that the production server 102 is located at the site of the production factory 108, and the customer and production manager communicate locally with the production server 102 at the site of the production facility 108. Although FIGS. 1 and 2 illustrate two production environments, it is noted that these are only example environments, and that various other production environments are possible and are contemplated by this disclosure. For example, another production environment may have the production server 102 located at the production facility 108, while one or both of the customer and production manager communicate remotely with the on-site production server 102 via a customer device 104 and production manager device 106, respectively. Another production environment may have multiple print factories 108 managed by a single, centralized production server 102. In addition, there can be multiple customer devices 104 communicating with the production server 102 simultaneously.

Figure 3:
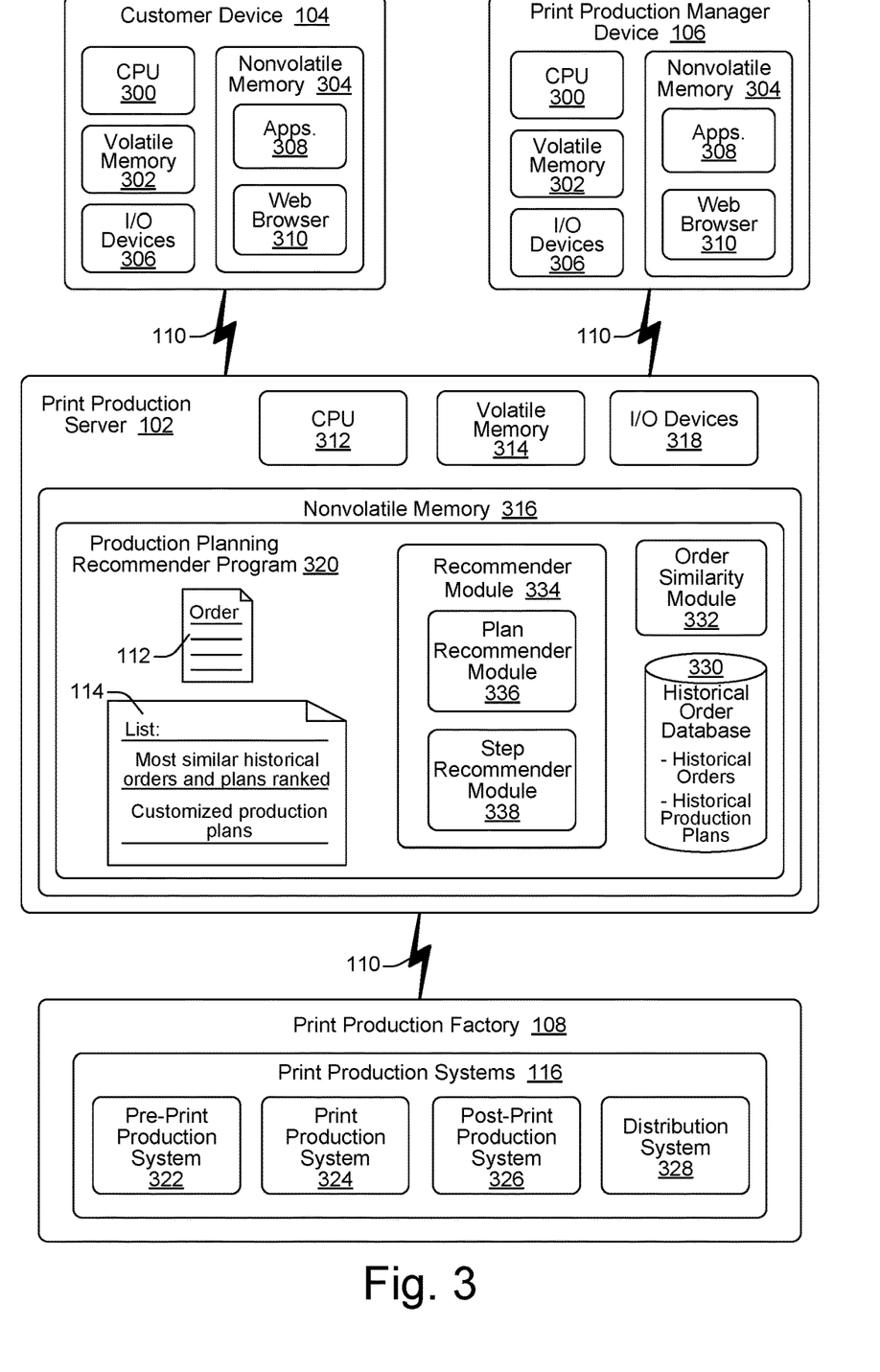
FIG. 3 shows a detailed block diagram representation of an example print production environment configured to operate within a commercial printing industry, according to an embodiment.

Although the production plan recommender as disclosed herein is generally applicable to various industries on a "made-to-order" basis, the disclosed embodiments are primarily illustrated and discussed within the context of the commercial printing industry. Accordingly, FIG. 3 shows a detailed block diagram representation of an example print production environment 100 configured to operate within a commercial printing industry, according to an embodiment of the disclosure. As shown in FIG. 3, the print production environment 100 includes print production server 102, customer device 104, print production manager device 106, and print production factory 108.

Customer device 104 and print production manager device 106 are generally implemented as any of a variety of conventional computing devices configurable to communicate with a server (e.g., production server 102) including, for example, a wireless communications device such as a cellular telephone or smart phone, a personal digital assistant (PDA), a tablet PC or other portable computer, a handheld PC, a desktop PC, a workstation, a set-top box, combinations thereof, and so on. Devices 104 and 106 generally include a processor (CPU) 300, a volatile memory 302 (i.e., RAM), and a nonvolatile memory 304 (e.g., ROM, hard disk, floppy disk, CD-ROM, etc.). Devices 104 and 106 also may include various input/output devices 306 such as a keyboard, a mouse, and a monitor. Nonvolatile memory 304 and volatile memory 302 are processor-readable media that generally provide storage of computer/processor-readable instructions, data structures, program modules and other data.

Customer device 104 and print production manager device 106 may implement various application programs 308, such as a web browser 310, and/or other instructions stored in memory 304 and/or volatile memory 302 that are executable on processor 300 to enable transactions with production server 102 via a local and/or remote link (e.g., a cable, or network 110) through the input, manipulation, and/or other preparation of data in electronic form (e.g., through text entry, mouse clicks, etc.). In one implementation, for example, client device 102 executes instructions from web browser 310 to access, view, and input data onto a print order form 112 served by production server 102.

Print production server 102 of FIG. 3 is intended to represent any of a variety of web servers capable of manipulating data and other content and delivering it over a network 110, such as the Internet, to devices such as customer device 104 and print production manager device 106, and to print production factory 108. Print production server 102 may be implemented as any of a variety of conventional computing devices configurable to communicate with devices 104, 106, and print production factory 108, including, for example, a workstation, a desktop PC, a tablet PC or other portable computer, a wireless communications device, combinations thereof, and so on. Print production server 102 generally includes a processor (CPU) 312, a volatile memory 314 (i.e., RAM), and a nonvolatile memory 316 (e.g., ROM, hard disk, floppy disk, CD-ROM, etc.). Print production server 102 also may include various input/output devices 318 such as a keyboard, a mouse, and a monitor. Nonvolatile memory 316 and volatile memory 314 are processor-readable media that generally provide storage of computer/processor-readable instructions, data structures, program modules and other data.

Print production server 102 may implement various application programs and/or other instructions stored in memory 316 and/or volatile memory 314 that are executable on processor 312 to enable transactions with customer device 104, print production manager device 106, and print production factory 108 via a network 110, through the input, manipulation, and/or other preparation of data in electronic form (e.g., through text entry, mouse clicks, etc.). In one implementation, for example, processor 312 on print production server 102 executes instructions from production planning recommender program 320 to receive an incoming order 112 from a customer (e.g., at customer device 104), provide a list 114 of historical orders and production plans to production manager (e.g., at production manager device 106), and admit a selected production plan to print production factory 108 to fulfill the incoming order 112.

In a typical commercial print production process, a customer creates digital material to be printed or works with a third-party provider to generate the material to be printed (e.g., photographs, brochures, course materials, periodicals, books, advertisements, product packaging). The customer then submits an order including one or more materials for the PSP (print service provider) to print. The order is effectively a Statement Of Work document that describes the customer's print intent. The order can include details such as the substrate stock, number of copies, and any special instructions such as laminating and quality level. It may also describe the transactional information such as due date, shipping methods and payment.

A customer order document can be composed of unstructured and/or structured data. Unstructured data is generally textual data that can include, for example, handwritten notes taken by a clerk at the PSP's storefront, or a text field in a web-based order form submitted through a web-print portal (e.g., an "Additional comments" field that allows customers to type in specific finishing instructions). Examples of structured data are categorical data such as the customer's selection of a binding choice out of a predetermined binding option pool provided by the factory (e.g., case binding, perfect binding, tape binding, sewn binding, wire binding, plastic comb binding). The structured data can be collected using a hand-written order form or through a web-based order form submitted through a web-print portal.

Figure 4:
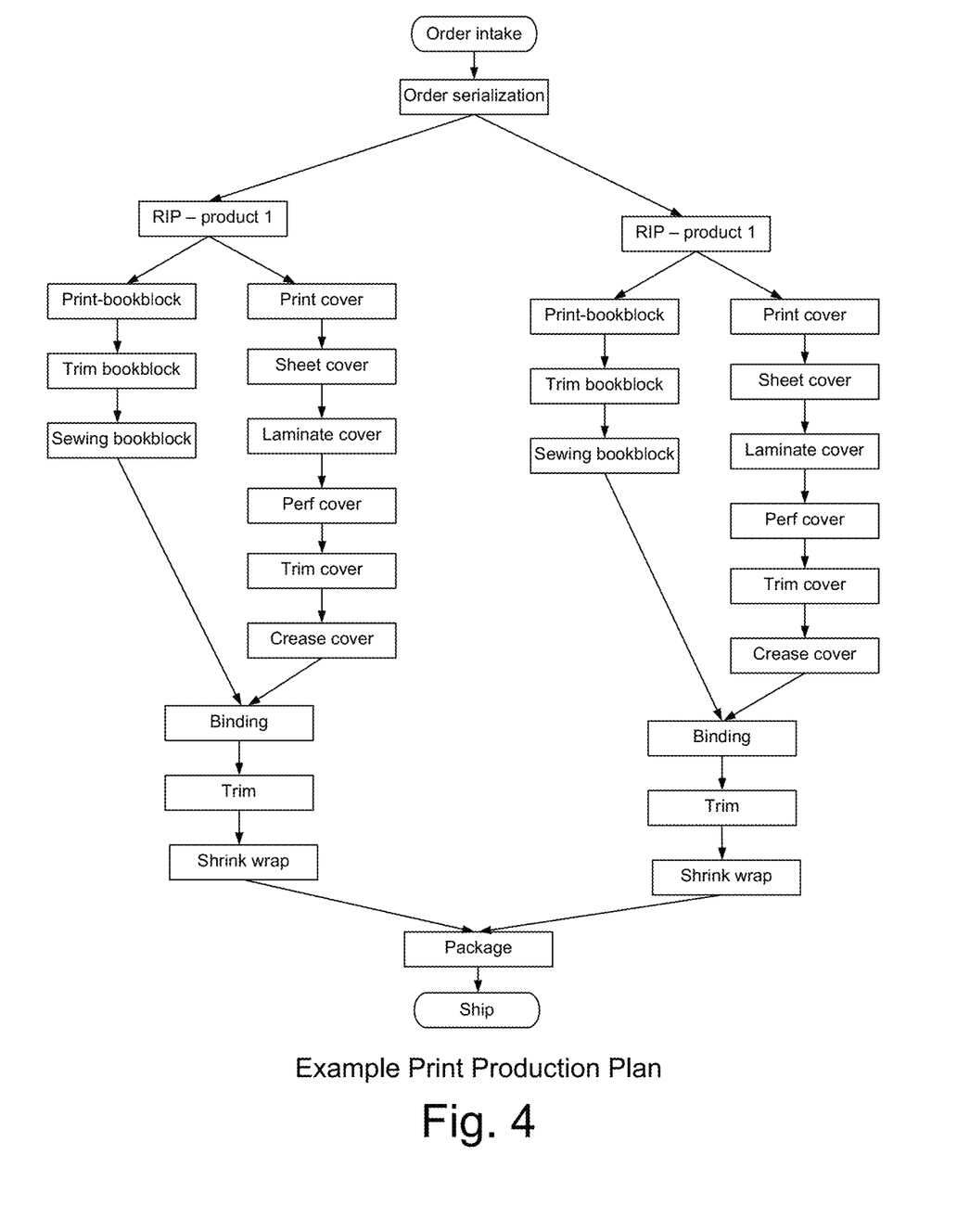
FIG. 4 shows an example print production plan, according to an embodiment.

When an order is submitted, a production plan is devised that controls how the order is to be fulfilled at a print production factory. FIG. 4 shows an example print production plan, according to an embodiment of the disclosure. A print production plan specifies the selection of production procedures needed to fulfill the order. Thus, the production sequence is typically a direct acyclic graph. Production planning takes into account machine availability, capability and capacity at the print production factory, as well as the impact on the cost and lead time (time taken to fulfill the order).

A print production factory (e.g., print production factory 108) may include a number of production operations/systems 116, such as a pre-print production system 322, a print production system 324, a post-print production system 326, and a distribution system 328. During pre-print production, a pre-print production system 322 converts a print job into a prerequisite format such as an electronic bitmap file. During print production, printing machines in the print production system 324 print the print job. Printing machines may include any of a variety of printing devices, such as digital printing presses, commercial laser printers, commercial inkjet printers, large and small format printers, and so on. During post-print production, the post-print system 326 finishes the print job, for example, by laminating, cutting, collating, and binding it. A distribution system 328 may be included to complete production of the print product by sorting, binning, packaging, and shipping it to the customer. Quality Assurance (QA) may also be implemented during one or more of the production operations. Each of the production operations may also include automated processes and/or manual processes.

Referring again to FIG. 3, the production planning recommender 320 finds and recommends the best production plan for any incoming order using machine learning algorithms. The production planning recommender 320 maintains a historical order database 330 that includes historical orders and the associated final production plans that have been successfully fulfilled. The production planning recommender 320 also includes an order similarity module 332 that compares and finds the similarity between an incoming order and the historical orders in the database 330. The similarity module 332 includes instructions, that when executed on a processor cause the processor to implement a similarity matching algorithm that calculates a similarity score between an incoming order 112 and each historical order in the database 330.

The similarity module 332 begins the process of matching the similarity of an incoming order 112 with historical orders by first processing the incoming order and extracting all the attributes and their corresponding values to generate a set of key-value pairs. If the incoming order is in XML format, the XML structure is flattened. As noted generally above, print order information blends in structured components and unstructured components. The structured components are represented by a set of categorical attributes. The unstructured components are converted into a set of textual attributes, and the textual attributes are processed.

For textual attributes, all the stop words are removed and important keywords are extracted. In addition, semantic associations of words are extracted and proper names are identified, such as customer names, print styles, and so forth. The customer names (e.g., IBM, Bank of America), specific print devices requested (e.g., Scitex FB7500), specific print styles requested (e.g., saddle-stitching, side-stitching, perfect binding, or case binding), are important indicators of the nature of the order.

A cosine similarity function is applied to quantify the textual similarity. The cosine similarity function allows comparing vectors that are represented by keyword sets. In order to make the similarity computing approach efficient, a number of indices are created and maintained for various attributes over which the similarity functions are computed. The cosine similarity function is calculated in the following manner:

$$\text{Cosine Similarity} = (Va \cdot Vb)/(\|Va\| * \|Vb\|)$$

where (kw1, kw2, ..., kwn) is the union of a set of keywords extracted from two textual fields a and b, Va and Vb are vectors representing the significance of extracted keywords in textual fields a and b, $\|Va\|$ and $\|Vb\|$ represent vector magnitudes, and $Va \cdot Vb$ represents the dot product of vectors Va and Vb.

In the calculation of the cosine similarity function, word vectors are considered that are composed of the significance of various words. Word significance is calculated as the product of word frequency (i.e., the number of times that a given word occurs in the order) and word importance. Word importance is a weight chosen to differentiate the key strings ("names") (e.g., customer name, equipment name, binding method name, etc.) from regular words. Similarity performance can be further improved by learning and tuning the weight parameters. As the size of the data set (i.e., the number of historical orders in database 330) increases, through learning and tuning, the distribution of the weight parameters is closer to reflect the true nature of the business of the print production factory 108.

The historical order database 330 and the index repository can be built based on software components, such as from Lucene, an open-source software package. These repositories are libraries (or knowledge bases) for text indexing and searching algorithms.

For each categorical attribute in the print order information, a distance function is defined that takes any two values of the attribute and generates a numerical similarity value between 0 and 1. In similarity computing, a common practice of assigning categorical data a numerical value is to sort all the categorical data of the attribute and assign the order data as the corresponding numeric value. The distance between two categorical data is thus calculated as the absolute difference of their numerical values. For instance, a "depth" attribute can have categorical value of "deep" "normal" "shallow". Numerical values can be assigned as "deep=1", "normal=0", and "shallow=−1". The distance between "shallow" and "deep" is therefore |−1−1|=2.

In print production planning each attribute has a specific meaning to production planning. Different categorical values within the context of product planning may have no effective difference, in which case the distance should be zero. On this basis, methods are derived that assign numerical values to categorical values based on their impact to production planning. To illustrate this, consider the following example about the attribute, "page dimension". Given a sheet-fed press and substrate, the page dimension dictates how many pages can be printed on the same substrates. For instance, a particular printing press can use a substrate of 12.6"×18.7". A page dimension of 6"×9" and a page dimension 5.5"×8.5" result in the same number of pages (i.e., 4) on the same sheet. A page dimension of 9"×11" results in a different number of pages (i.e., 2) on the same sheet. This has direct impact to production planning in terms of choices of machines and estimated lead time. Consequently, the numerical values are assigned to the categorical values of "page dimension" according to the number of pages that can be placed on the same sheet. The distance between 6"×9" and 5.5"×8.5" is 0 (zero), and the distance between 6"×9" and 9"×11" is 2 (two). The same assignment methodology is applied to other attributes within the incoming print order 112. This value assignment methodology is pre-engineered, and can also be improved through learning and tuning in manner similar to that of improving the word importance weight function discussed above.

The similarity score calculated by similarity module 332 is a normalized, aggregated, weighted similarity score that measures an incoming order 112 against an existing historical order in the historical order database 330. The normalized, aggregated, weighted similarity score that measures an incoming order 112 against an existing historical order is calculated in the following manner:

$$Sim(O, S_j) = \frac{\sum_{i=1}^{N} S_{i,j} W_i}{\sqrt{\sum_{i=1}^{N} W_i^2}}, \sum_{1}^{N} W_i = 1$$

where O is an incoming order, Sj is a historical order in the database 330, N is a total number of textual and categorical attributes over which attribute similarity scores are computed, $S_{i,j}$ is an attribute similarity score of the attribute i in O and Sj, and Wi is a weight coefficient assigned to attribute i.

The similarity of an incoming order 112 against an existing historical order is computed on all text attributes based on the indices. The results from attribute-based similarity measurement lists are aggregated into a final print order similarity value. The similarity function takes into account the weighted similarity scores of individual attribute-based similarity scores. Weight coefficients "w" are defined to signify the importance of each attribute in the similarity function. The values of the weight coefficients can be tuned through a user feedback phase to increase the accuracy of the returned results.

Referring again to FIG. 3, the production planning recommender 320 also includes a recommender module 334 that comprises a plan recommender module 336. After the similarity matching algorithm of similarity module 332 calculates the normalized, aggregated, weighted similarity score of an incoming order 112 against each historical order in the historical order database 330, the plan recommender module 336 executes to generate a "top-n" most similar historical order list 114. The most similar historical orders on the list 114 are selected based on their calculated similarity scores, and they are arranged on the list 114 from highest to lowest score, with the highest scored historical order being at the top of the list 114. The highest scored historical order on the list 114 is therefore the historical order in database 330 that is the most similar to the incoming order 112. The most similar historical order list 114 also reports the similarity score for each historical order on the list, and it includes a production plan identifier that identifies the historical production plan that was used to successfully fulfill each corresponding historical order on the list 114. Accordingly, the historical production plan corresponding with the highest scored historical order on the list 114 is the historical production plan being recommended to fulfill the incoming order 112, and it is typically the production plan selected by the production manager to fulfill the incoming order.

Figure 5:
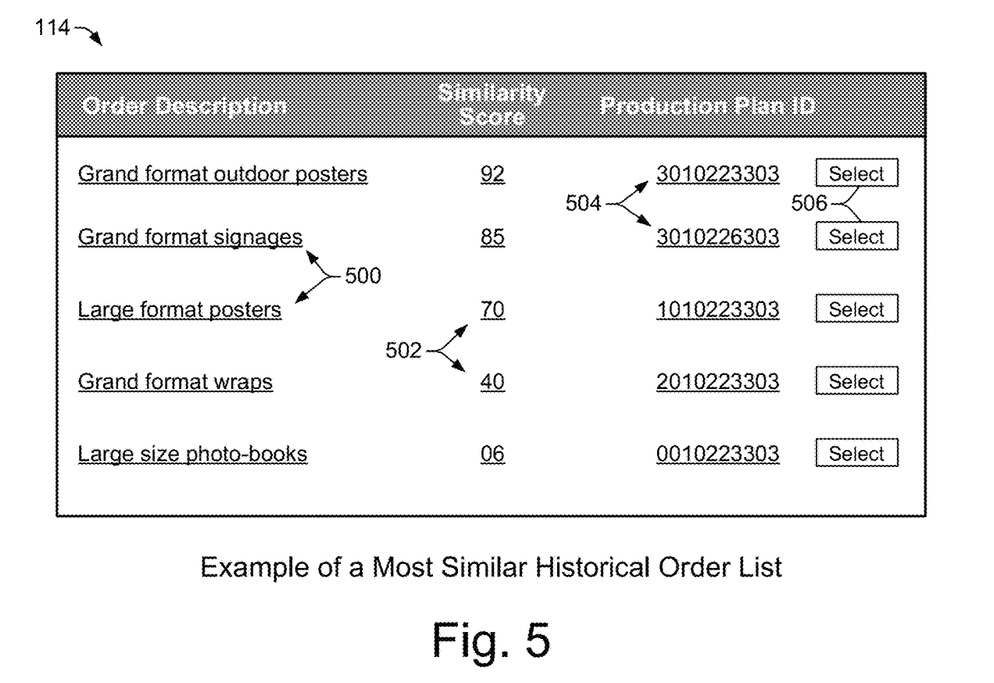
FIG. 5 shows an example of a most similar historical order list and user interface, according to an embodiment.

FIG. 5 shows an example of a most similar historical order list 114 and user interface, according to an embodiment of the disclosure. Historical orders 500 are shown on the list 114 according to their order descriptions. Each historical order in the list 114 includes its similarity score 502 and corresponding historical production plan 504. The user interface provides clickable links for the historical orders 500, similarity scores 502 and corresponding production plans 504, as well as a "Select" icon button 506 enabling the production manager to select the historical production plan 504 that corresponds with the highest scored historical order 500 (or another historical order on the list). Upon clicking on the link to a historical order 500, a pop-up window will display the complete historical order document. Upon clicking on the link to a similarity score 502, a pop-up window will display detailed calculation steps used to generate the score. Upon mousing over the historical production plan ID 504, a thumbnail of the plan graph is displayed. Upon clicking on the link to the historical production plan ID 504, a pop-up window will display plan details. Upon pressing a "Select" icon button 506, the historical production plan 504 is selected for admission to the production factory 108 to fulfill the incoming order 112.

The production manager can elect to accept the historical production plan 504 corresponding with the highest similarity score as the plan to use for fulfilling the incoming order 112. Upon the production manager's approval, this recommendation will be admitted as the production plan to be released to the factory floor for fulfillment. Upon successful fulfillment of the incoming order 112, the approved/selected historical order 500 (presumably the historical order with the highest similarity score 502) and its corresponding historical production plan 504 will be saved into the historical order database 330.

Referring again to FIG. 3, the recommender module 334 also comprises a step recommender module 338. In the event that the incoming order 112 is a new order (e.g., has new print product types, unusual customization requirements, etc.) for which the list 114 of most similar historical orders does not contain an ideal match to fulfill the incoming order, the production planning recommender 320 guides the production manager through a customization process to customize one of the production plans on the list 114. Thus, the production manager may elect to use the production plan of the most similar historical order as the starting point. The step recommender module 338 executes to implement a step recommendation algorithm that guides the production manager to complete the customization of the production plan. When the production manager chooses to edit an existing production plan, or decides to create a new production plan (as discussed below with respect to FIGS. 7 and 8), the step recommendation algorithm provides recommendations on the next steps to be included in the plan as soon as the current step is committed, guiding the production manager iteratively until the plan is completed.

Figure 6:
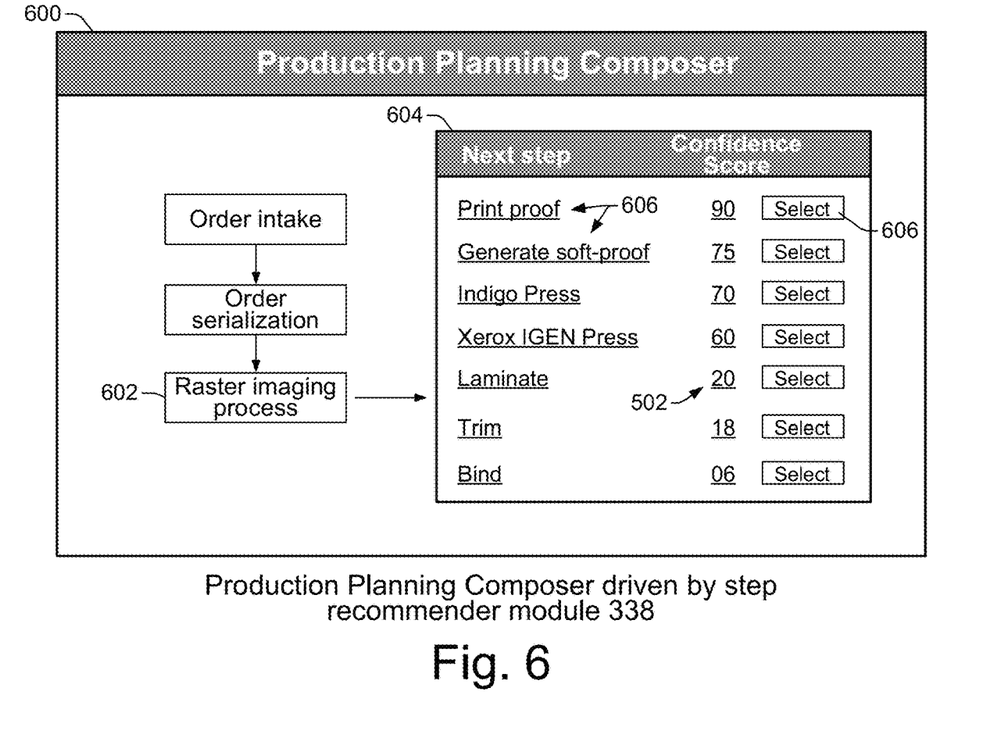
FIG. 6 shows an example production planning composer and user interface driven by a step recommendation algorithm, according to an embodiment.

FIG. 6 shows an example production planning composer 600 and user interface driven by the step recommendation algorithm of module 338, according to an embodiment of the disclosure. In this scenario, the list 114 of most similar historical orders does not contain an ideal match to fulfill the incoming order. This is typically indicated by historical orders in the list 114 having lower similarity scores. Therefore, the production manager has selected a production plan from the most similar historical order list 114 (e.g., see FIG. 5) that will be used as a starting point from which to devise a customized production plan suitable for fulfilling the incoming order 112. The customization begins when the production manager clicks on a production step (i.e., to edit, or change) from the selected production plan. When the production manager clicks on an initial production plan step 602 (e.g., Raster Imaging Process) for editing, as shown in FIG. 6, a pop-up window 604 is displayed showing the top recommended next-steps or candidates next-steps 606. Upon clicking the link to a candidate next-step 606, a pop-up window will display the similar historical orders that have used this step. Upon clicking the link to a candidate next-step similarity score 608, a pop-up window will display detailed calculation steps. Upon pressing a "Select" icon button 610, the associated candidate next-step will be added to the production plan, replacing the initial production plan step 602.

In cases where the incoming order 112 is a new order for which there is no matching historical order in the historical database, the production planning recommender 320 guides the production manager through a process of generating an entirely new production plan to enable fulfillment of the incoming order 112. In this scenario, the production planning recommender 320 does not provide a list 114 of most similar historical orders because the calculated similarity scores are too low to overcome a similarity score threshold. Therefore, the production manager begins from scratch to devise an entirely new production plan, guided by the production planning recommender 320.

Figure 7A:
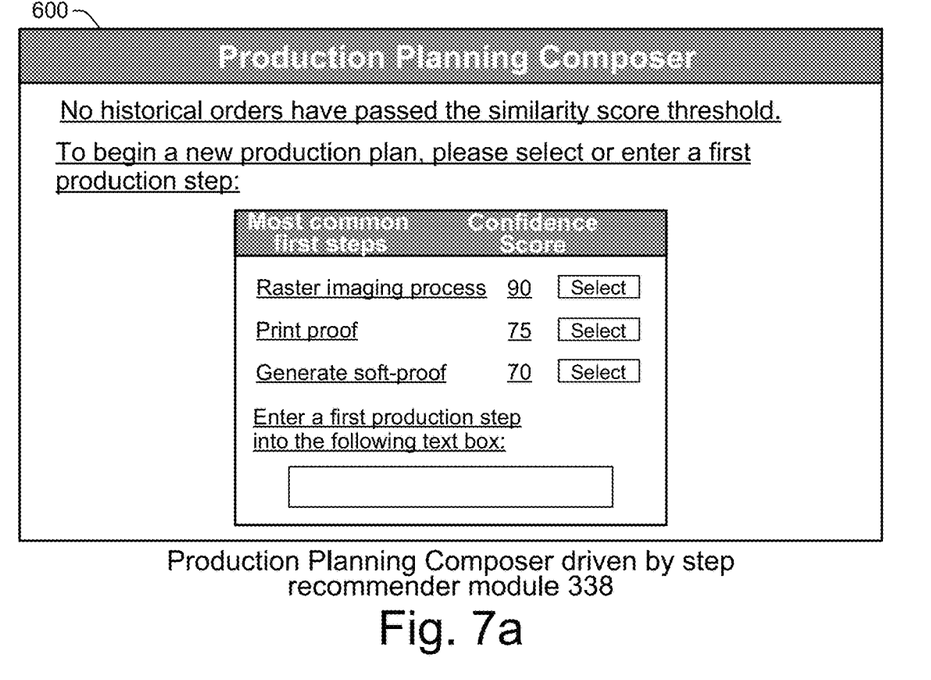
FIG. 7 shows an example of a production planning composer and user interface driven by a step recommendation algorithm where no historical orders in a historical database have passed a similarity score threshold, according to an embodiment.
Figure 7B:
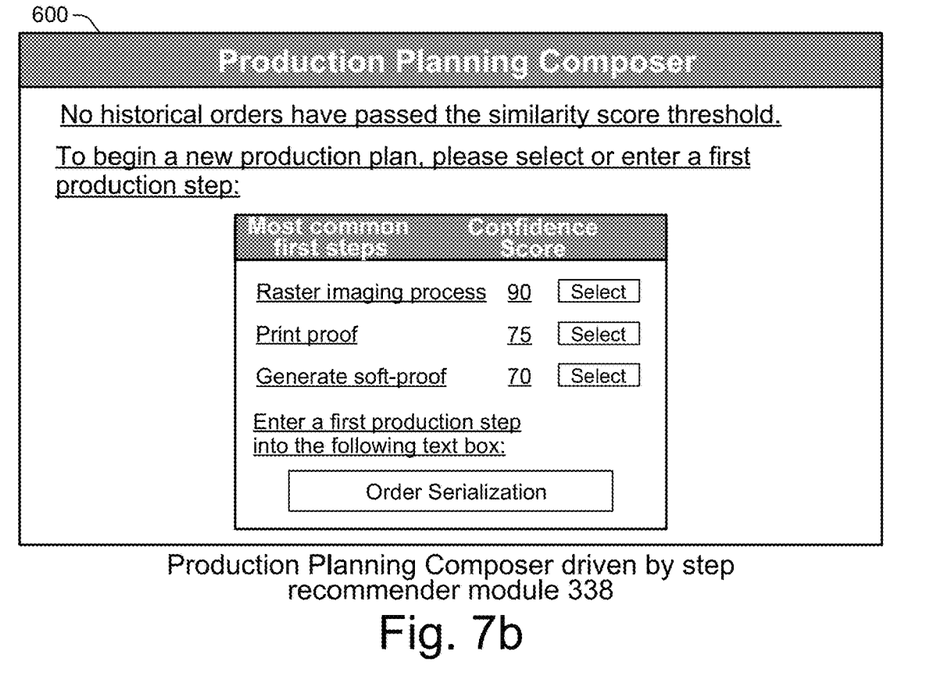
Figure 8:
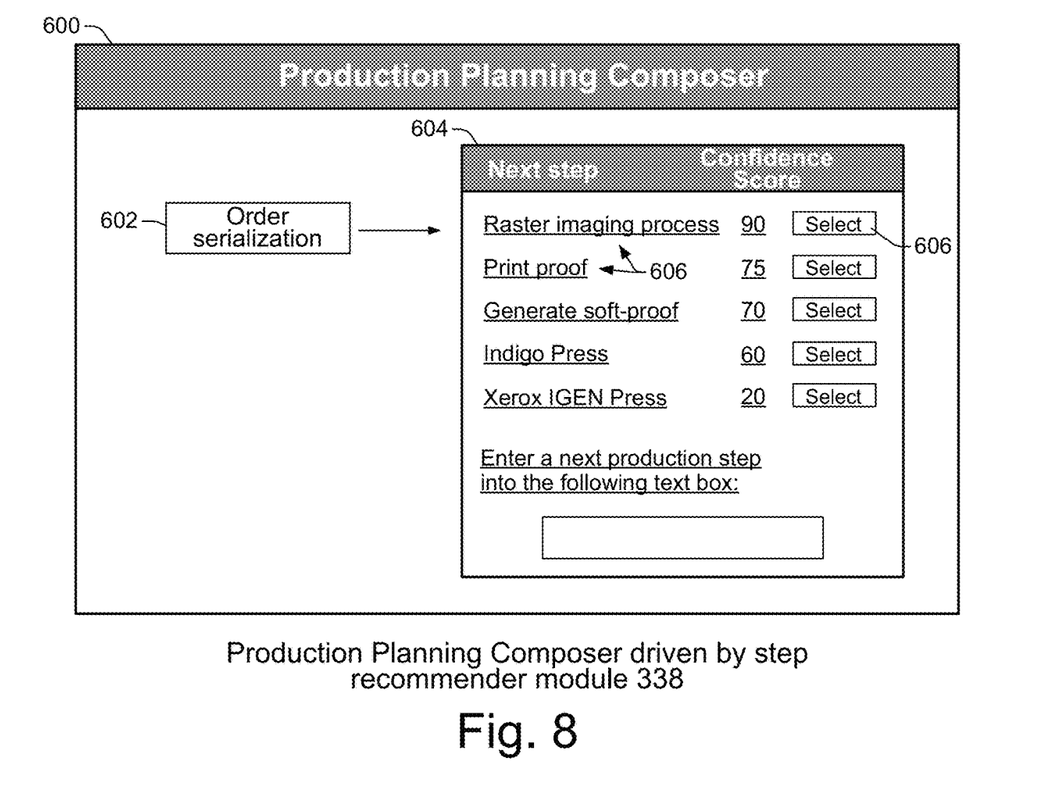
FIG. 8 shows an example of a production planning composer and user interface driven by a step recommendation algorithm where no historical orders in a historical database have passed a similarity score threshold, according to an embodiment.

FIGS. 7 and 8 show examples of a production planning composer 600 and user interface driven by the step recommendation algorithm of module 338 where no historical orders in the historical database have passed a similarity score threshold, according to an embodiment of the disclosure. As shown in FIG. 7a, when there are no historical orders whose similarity scores pass a similarity score threshold, the step recommender controls the production planning composer 600 to provide an appropriate indication to the production manager (e.g., "No historical orders have passed the similarity score threshold"), and to request a first production step to be entered for a new production plan. The production planning composer also includes a list of the most common first production steps from which the production manager may choose. This list is sorted with the most common first production step at top, similar to the next-step recommendation list shown in FIG. 6. Thus, the production manager can select from the list of most common first production steps, or he/she may enter a first production step into a text box. FIG. 8 illustrates the production planning composer 600 after the production manager has entered a first production step.

In both scenarios (i.e., where a selected production plan is being customized as described with reference to FIG. 6, or where an entirely new production plan is being generated as described with reference to FIGS. 7 and 8), the step recommendation algorithm of step recommender module 338 operates in the same general way. The step recommendation algorithm first finds the top-k most similar orders (Sj) to the current incoming order (O). In one implementation, such as when an entirely new production plan is being generated, Sj can include the entire historical order database. The step recommendation algorithm then analyses the corresponding historical production plans of the historical order (P(Sj)). In each of the production plans P(Sj), it finds the corresponding step (the most similar step) to the current step in the production plan P(O) being customized or being newly generated. It then collects all the following steps of the corresponding step which will form the set of all candidate next-steps for the step recommendation. It then ranks the candidate next-steps (based on the similarities of historical orders and the current incoming order, and the similarities of the content of the step and the step sequence), and presents these candidate next-steps to the production manager as shown in FIGS. 6 and 8.

For a given step within a given production plan, step sequence is a direct graph containing all the steps prior to this step as its nodes and the precedence constraints between the nodes as its direct edges (e.g., a portion of FIG. 4). Step sequence quantifies how a given production plan leads to this current step from the starting point. To identify the corresponding steps in the production plan P(O) being customized or newly generated and a given past plan P(Sj), the step recommendation algorithm also compares their corresponding step sequence.

The step recommendation algorithm of step recommender module 338 has two main components: step matching and step recommendation. The step matching algorithm computes the step similarity in the following way:

$$Sim(s_{n,new}, s_{i,old}) = \text{textSim}(s_{n,new}, s_{i,old}) + \text{pathSim}(s_{n,new}, s_{i,old})$$

$$\text{where pathSim}(s_{n,new}, s_{i,old}) = \Sigma_1^i \text{textSim}(s_{j,new}, s_{j,old})$$

where $s_{n,new}$ is the last step committed in the production plan P(O) being customized or newly generated, $s_{i,old}$ is a step in a historical production plan P(Sj) currently under similarity evaluation, textSim( ) function is a measure of the similarity of the keywords on the labels of a step, computed based on the algorithm illustrated above where this algorithm is applied to analyze a historical order, and pathSim( ) function is a measure of the similarity of the step sequence.

Once a step is committed in a production plan P(O) being customized or newly generated, the step matching algorithm identifies a step in a historical production plan P(Sj) that corresponds to the last committed step in P(O). The step matching algorithm quantifies the similarity between two steps, and assigns the most similar step in P(Sj) as the corresponding step of the last committed step in P(O). The step matching algorithm applies keyword similarity calculation between two steps (textSim( ) function). The step matching algorithm also calculates the step sequence similarity between two steps. It incorporates the approximate sequence matching between the two step sequences: a direct graph based on the production plan P(O) being customized or being newly generated, ending at the last committed step, and a direct graph based on P(Sj) ending at a candidate matching step (starting from the Start state in both plans). The step sequence similarity is computed based on the similarities of the step labels (keywords) and the order in which these steps appear in the direct graph, shown above as PathSim( ) function. The step matching algorithm applies the path similarity method to compute the edit-distance of the paths at the step sequence level taking into account that each of the steps may not exactly match to each other. In order to bound the computation, computing of the sequence similarity may be limited to the top-k (e.g., k=5) candidate matching steps in each historical plan. However, k can be any value between 1 and the entire historical database. The step matching algorithm computes the step similarity taking into account both textSim( ) and PathSim( ). Using this step similarity score (Sim(sn,new si,old)), the step matching algorithm chooses the step in a historical production plan P(Sj) that is the most similar to the last step committed in the production plan P(O) being customized or being newly generated, as "the corresponding step".

Once the step matching algorithm identifies the corresponding step in a historical production plan P(Sj), the step recommendation algorithm collects the next step after the corresponding step. Next, the step recommendation algorithm ranks the next steps from all candidate historical production plans P(Sj). The ranking algorithm is based on a weighted sum of the similarities between the historical orders and the similarities between the steps. The step recommendation scoring algorithm ranks the steps as follows:

$$S_{j,Recommended} = Sim(O, S_j) * w_1 + Sim(S_{n,new}, S_{i,old}) * w_2$$

where O is the current incoming order, sn,new is the last step committed in the production plan P(O) being customized or being newly generated, Sj is the historical order, si,old is a step in the historical production plan P(Sj) currently under similarity evaluation, and Sim(O, Sj) is calculated according to the above, Sim(Sn,new, Si,old) is calculated according to the above, and $w_1$ and $w_2$ are weight parameters. In one implementation, higher weight is given to Sim(O, Sj). In other implementations, higher weight can be assigned to the $2^{nd}$ term, or user feedback can be used to tune the weight assignment.

The recommended step of the highest ranked historical plan is ranked higher. In some cases, for example, when there is branch of several steps after the given matching step in the historical plan, several steps from the same plan may be recommended with a note that all these steps appear to be following the matching step.

Figure 9:
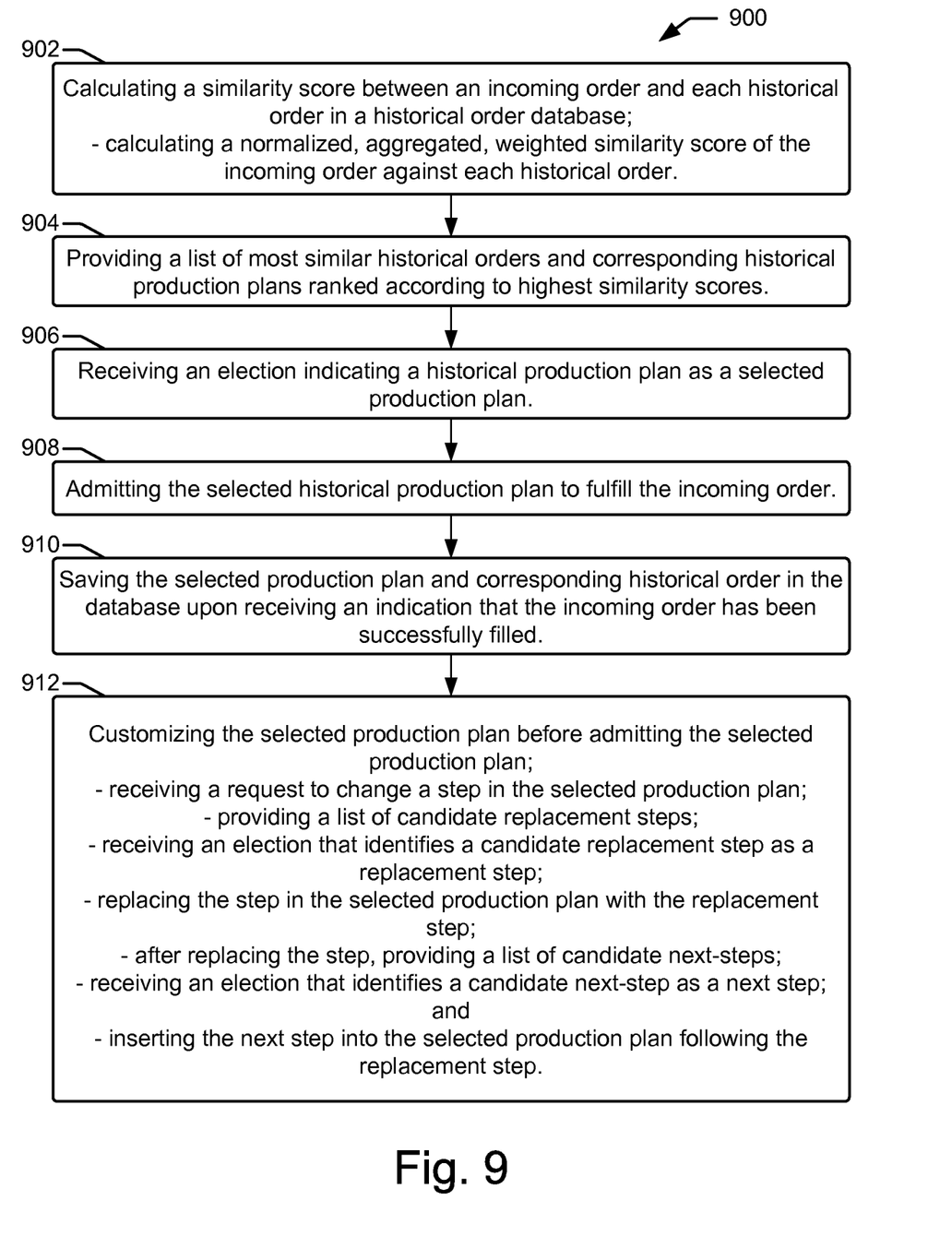
FIG. 9 shows a flowchart of an example method of recommending a production plan, according to an embodiment.

FIG. 9 shows a flowchart of an example method 900 of recommending a production plan, according to an embodiment of the disclosure. Method 900 is associated with the embodiments discussed above with regard to FIGS. 1-8, and details of the steps shown in method 900 can be found in the related discussion of such embodiments. Method 900 may include more than one implementation, and different implementations of method 900 may not employ every step presented in the flowchart. Therefore, while steps of method 900 are presented in a particular order in the flowchart, the order of their presentation is not intended to be a limitation as to the order in which the steps may actually be implemented or whether all of the steps may be implemented. For example, one implementation of method 900 might be achieved through the performance of a number of initial steps, without performing one or more subsequent steps, while another implementation of method 900 might be achieved through the performance of all of the steps.

Method 900 begins at block 902 with calculating a similarity score between an incoming order and each historical order in a historical order database. Calculating the similarity score comprises calculating a normalized, aggregated, weighted similarity score of the incoming order against each historical order. As shown at block 904, method 900 includes providing a list of most similar historical orders and their corresponding historical production plans ranked according to highest similarity scores. In one implementation, the list is provided to a production manager through a user interface of a production server.

The method 900 continues at block 906 with receiving an election indicating a historical production plan as a selected production plan. In one implementation, the election is received from a production manager entering the election through a user interface of a production server. At block 908, based on the election, the selected historical production plan is admitted to fulfill the incoming order. At block 910 of method 900, the selected production plan and corresponding historical order are saved in the database upon receiving an indication that the incoming order has been successfully filled.

Another implementation of method 900 continues at block 912. At block 912, the method 900 includes customizing the selected production plan before admitting the selected production plan. Customizing the selected production plan includes receiving a request to change a step in the selected production plan. For example, in one implementation the request to change a step may come in the form of a production manager selecting or clicking on the step, or otherwise identifying the step, through a user interface of a production server. Customizing the selected production plan further includes providing a list of candidate replacement steps. For example, the list of candidate replacement steps is provided to the production manager in response to the request. Customizing the selected production plan then includes receiving an election that identifies a candidate replacement step as a replacement step, and replacing the step in the selected production plan with the replacement step. After replacing the step, a list of candidate next-steps may then be provided and an election may be received identifying a candidate next-step as the next step to be committed to the plan. This next step is then inserted into the selected production plan following the replacement step. As noted above in step 908, the selected production plan is admitted to fulfill the order. In the implementation just described at block 912, the selected production plan that is admitted will be a customized version of the selected production plan.

Figure 10:
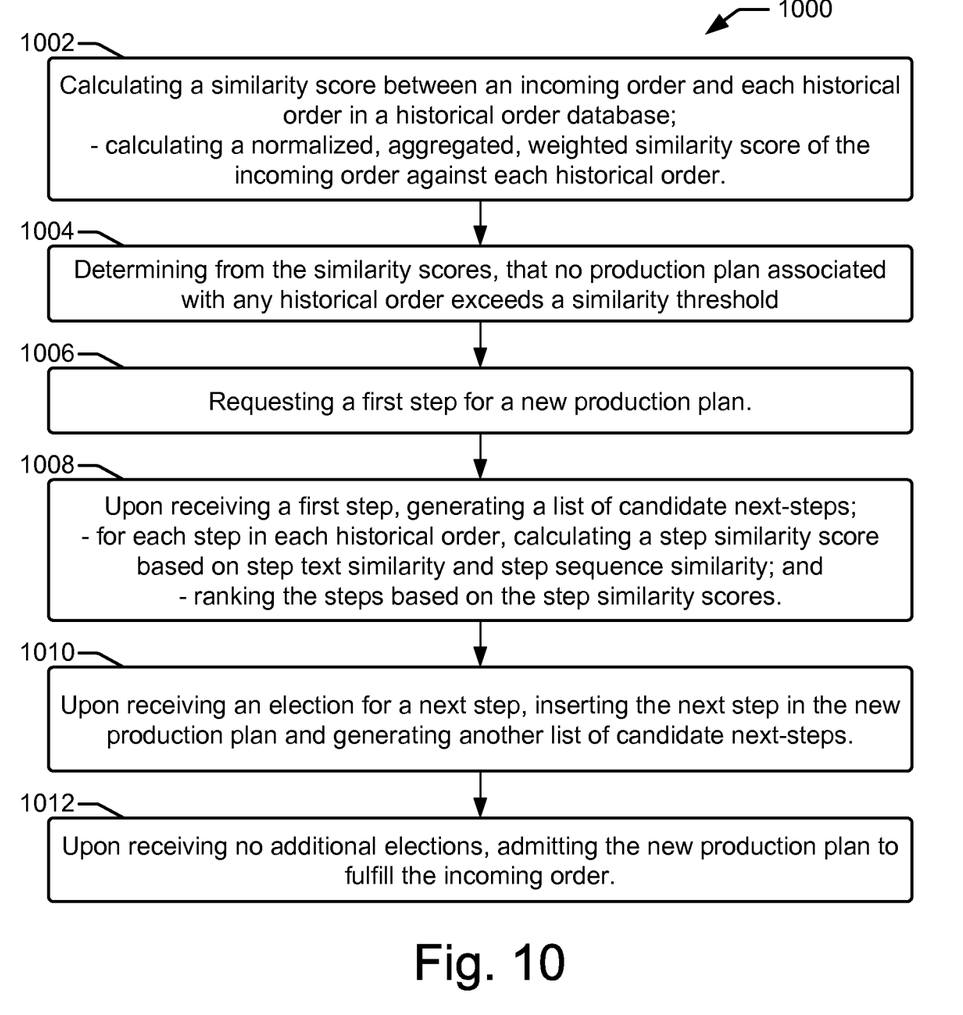
FIG. 10 shows a flowchart of an example method 1000 of recommending a production plan, according to an embodiment.

FIG. 10 shows a flowchart of an example method 1000 of recommending a production plan, according to an embodiment of the disclosure. Method 1000 is associated with the embodiments discussed above with regard to FIGS. 1-8, and details of the steps shown in method 1000 can be found in the related discussion of such embodiments. Method 1000 may include more than one implementation, and different implementations of method 1000 may not employ every step presented in the flowchart. Therefore, while steps of method 1000 are presented in a particular order in the flowchart, the order of their presentation is not intended to be a limitation as to the order in which the steps may actually be implemented or whether all of the steps may be implemented. For example, one implementation of method 1000 might be achieved through the performance of a number of initial steps, without performing one or more subsequent steps, while another implementation of method 1000 might be achieved through the performance of all of the steps.

Method 1000 begins at block 1002 with calculating a similarity score between an incoming order and each historical order in a historical order database. Calculating the similarity score comprises calculating a normalized, aggregated, weighted similarity score of the incoming order against each historical order. As shown at block 1004, method 1000 includes determining from the similarity scores, that no production plan associated with any historical order exceeds a similarity threshold. This scenario differs from the scenario presented in method 900 above, in that no list of most similar historical orders and corresponding historical production plans is presented to the production manager, because the similarity scores calculated for the historical orders are too low to exceed a similarity score threshold. Accordingly, there is no most similar historical order from which to select as an order to fulfill the incoming order, or from which to begin to customize. Thus, the production plan recommender will guide a production manager in the creation of a new production plan. Accordingly, at block 1006 of method 1000 a first step for a new production plan is requested. In one implementation, the request is made to a production manager through a production planning composer, user interface of a production server. The production planning composer includes a list of the most common first production steps from which the production manager may choose, or the production manager may enter a first production step (i.e., enter it into a text box).

As shown at block 1008 of method 1000, upon receiving a first step (e.g., from the production manager), a list of candidate next-steps is generated. For each step in each historical order, a step similarity score is calculated based on step text similarity and step sequence similarity. The steps are then ranked based on the step similarity scores.

At block 1010 of method 1000, upon receiving an election for a next step (e.g., from the production manager), the elected next step is inserted into the new production plan and another list of candidate next-steps is generated. The new production plan is admitted to fulfill the incoming order when no additional elections are received from the production manager.

What is claimed is:

1. A method of operating a printing production facility to produce hardcopy documents according to a production plan comprising:

at the printing production facility, receiving an incoming order to produce a number of hardcopy documents;

accessing a electronic database of historical orders for production of hardcopy documents;
calculating a similarity score between the incoming order and each historical order in the historical order database;
providing a list of a number of historical orders and corresponding historical production plans that are ranked according to similarity scores with respect to the incoming order;
receiving an election indicating a historical production plan from the list as a selected production plan;
admitting the selected production plan to fulfill the incoming order;
customizing the selected production plan before admitting the selected production plan wherein customizing the selected production plan comprises, at least, receiving input from a user indicating a request to change a step in the selected production plan; and
with the printing production facility, producing the number of hardcopy documents of the incoming order according to the selected production plan as customized by the receiving input.

2. A method as in claim 1, wherein calculating a similarity score between an incoming order and each historical order comprises calculating a normalized, aggregated, weighted similarity score of the incoming order against each historical order.

3. A method as in claim 1, wherein producing the number of hardcopy documents of the incoming order according to the selected production plan as customized by the receiving input further comprises, when specified in the incoming order, binding, trimming or packaging the number of hardcopy documents.

4. A method as in claim 1, wherein customizing the selected production plan further comprises:
providing a list of candidate replacement steps;
receiving an election that identifies a candidate replacement step as a replacement step; and
replacing the step in the selected production plan with the replacement step.

5. A method as in claim 4, wherein customizing the recommended historical production plan further comprises:
after replacing the step, providing a list of candidate next-steps;
receiving an election that identifies a candidate next-step as a next step; and
inserting the next step into the selected production plan following the replacement step.

6. A method of operating a printing production facility to produce hardcopy documents according to a production plan comprising:
at the printing production facility, receiving an incoming order to produce a number of hardcopy documents;
accessing a electronic database of historical orders for production of hardcopy documents;
calculating a similarity score between the incoming order and each historical order in the historical order database;
determining from the similarity scores, that no production plan associated with any historical order exceeds a similarity threshold;
requesting a first step for a new production plan;
upon receiving a first step, generating a list of candidate next-steps;
upon receiving an election for a next step, inserting the next step in the new production plan and generating another list of candidate next-steps;
upon receiving no additional elections, admitting the new production plan to fulfill the incoming order; and
with the printing production facility, producing the number of hardcopy documents of the incoming order according to the new production plan including, when specified in the incoming order, binding, trimming or packaging the number of hardcopy documents.

7. A method as in claim 6, wherein generating a list of candidate next-steps comprises:
for each step in each historical order, calculating a step similarity score based on step text similarity and step sequence similarity; and
ranking the steps based on the step similarity scores.

8. A non-transitory processor-readable medium storing code representing instructions that when executed by a processor cause the processor to operate in a production facility to produce physical products according to a production plan, the instructions causing the processor to:
at the production facility, receive an incoming order to produce a number of physical products;
access a electronic databased of historical orders for production of physical products documents;
calculate a similarity score between the incoming order and each historical order in the historical order database;
provide a list of a number of historical orders and corresponding historical production plans that are ranked according to similarity scores with respect to the incoming order;
receive an election indicating a historical production plan from the list as a selected production plan;
admit the selected production plan to fulfill the incoming order;
customize the selected production plan before admitting the selected production plan for fulfillment of the incoming order by, at least, receiving a request to change a step in the selected production plan; and
with the production facility, produce the number of physical product of the incoming order according to the selected production plan as customized by the receiving input.

9. The processor-readable medium of claim 8, wherein the similarity score is a normalized, aggregated, weighted similarity score calculated in accordance with $$Sim(O, S_j) = \frac{\sum_{i=1}^{N} S_{i,j} W_i}{\sqrt{\sum_{i=1}^{N} W_i^2}}, \sum_{1}^{N} W_i = 1$$

wherein:
O is an incoming order;
Sj is a historical order in the database;
N is a total number of textual and categorical attributes over which attribute similarity scores are computed;
Si,j is an attribute similarity score of the attribute i in O and Sj; and
Wi is a weight coefficient assigned to attribute i.

10. The processor-readable medium of claim 9, wherein an attribute similarity score comprises a textual attribute similarity score calculated by:
extracting keywords from the incoming order; and applying a cosine similarity function to quantify textual similarities between the keywords and the historical orders in the database.

11. The processor-readable medium of claim 10, wherein the cosine similarity function is applied in accordance with $$\text{Cosine Similarity} = (Va \cdot Vb)/(\|Va\| * \|Vb\|)$$

wherein:
- (kw1, kw2, kwn) is the union of a set of keywords extracted from two textual fields a and b;
- Va and Vb are vectors representing the significance of extracted keywords in textual fields a and b;
- $\|Va\|$ and $\|Vb\|$ represent vector magnitudes; and
- $Va \cdot Vb$ represents the dot product of vectors Va and Vb.

12. The processor-readable medium of claim 9, wherein an attribute similarity score comprises a categorical attribute similarity score determined by:
- assigning a numerical value to each categorical value of a categorical attribute based on a predetermined impact the categorical attribute has on production planning;
- calculating the absolute difference between the numerical value of an incoming order and the numerical value of a historical order.

13. The processor-readable medium of claim 8, further storing code representing instructions that when executed by the processor cause the processor to save the selected production plan in the database upon receiving an indication that the incoming order has been successfully filled.

14. The processor-readable medium of claim 8, wherein customizing the selected production plan further comprises:
- providing a list of candidate replacement steps;
- receiving an election that identifies a candidate replacement step as a replacement step; and
- replacing the step in the selected production plan with the replacement step.

15. The processor-readable medium of claim 14, wherein customizing the recommended historical production plan further comprises:
- after replacing the step, providing a list of candidate next-steps;
- receiving an election identifying a candidate next-step as a next step; and
- inserting the next step into the selected production plan following the replacement step.

16. The processor-readable medium of claim 14, wherein providing a list of candidate replacement steps comprises:
- for each step in each historical order, calculating a step similarity score based on step text similarity and step sequence similarity; and
- ranking the steps based on the step similarity scores.

17. The processor-readable medium of claim 16, wherein calculating a step similarity score comprises quantifying the similarity between two steps and assigning a most similar step as a corresponding step in accordance with $$\text{Sim}(s_{n,new}, s_{i,old}) = \text{textSim}(s_{n,new}, s_{i,old}) + \text{pathSim}(s_{n,new}, s_{i,old})$$

$$\text{where pathSim}(s_{n,new}, s_{i,od}) = \Sigma_1^i \text{textSim}(s_{j,new}, s_{j,old})$$

wherein:
- $s_{n,new}$ is the last step committed in the selected production plan;
- $s_{i,old}$ is a step in a historical production plan currently under similarity evaluation;
- textSim( ) function is a measure of the similarity of keyword text on labels of a step; and
- pathSim( ) function is a measure of the similarity of the step sequence.

18. The processor-readable medium of claim 16, wherein ranking the corresponding steps comprises ranking the corresponding steps based on a weighted sum of the similarity scores between the incoming order and each historical order and similarities between the corresponding steps in accordance with $$Sj, \text{Recommended} = \text{Sim}(O, Sj) * w1 + \text{Sim}(Sn, new, Si, old) * w2$$

wherein:
- O is a current incoming order;
- sn,new is the last step committed in the selected production plan;
- Sj is a historical order;
- si,old is a step in the historical production plan currently under similarity evaluation; and
- w1 and w2 are weight parameters.

19. A non-transitory processor-readable medium storing code representing instructions that when executed by a processor cause the processor to operate in a printing production facility to produce hardcopy documents according to a production plan, the instructions causing the processor to:
- at the printing production facility, receive an incoming order to produce a number of hardcopy documents;
- access a electronic databased of historical orders for production of hardcopy documents;
- calculate a similarity score between the incoming order and each historical order in the historical order database;
- determine from the similarity scores, that no production plan associated with any historical order exceeds a similarity threshold;
- request a first step for a new production plan;
- upon receiving a first step, generate a list of candidate next-steps;
- upon receiving an election for a next step, insert the next step in the new production plan and generate another list of candidate next-steps;
- upon receiving no additional elections, admit the new production plan to fulfill the incoming order; and
- with the printing production facility, producing the number of hardcopy documents of the incoming order according to the new production plan.

20. The processor-readable medium of claim 19, wherein generating a list of candidate next-steps comprises:
- for each step in each historical order, calculating a step similarity score based on step text similarity and step sequence similarity; and
- ranking the steps based on the step similarity scores.

* * * * *